US006889142B2

(12) United States Patent
Schonewille

(10) Patent No.: US 6,889,142 B2
(45) Date of Patent: May 3, 2005

(54) METHOD OF CORRECTING FOR TIME SHIFTS IN SEISMIC DATA RESULTING FROM AZIMUTHAL VARIATION

(75) Inventor: Michel Albert Schonewille, Guildford (GB)

(73) Assignee: PGS Exploration (UK) Limited, Walton-on-Thames (GB)

( * ) Notice: Subject to any disclaimer, the term of this patent is extended or adjusted under 35 U.S.C. 154(b) by 4 days.

(21) Appl. No.: 10/448,809

(22) Filed: May 30, 2003

(65) Prior Publication Data

US 2004/0243312 A1 Dec. 2, 2004

(51) Int. Cl.$^7$ .............................................. G01V 1/28
(52) U.S. Cl. ...................................................... 702/17
(58) Field of Search ............................ 702/14, 17, 18, 702/10

(56) References Cited

U.S. PATENT DOCUMENTS

| 6,272,435 | B1 | * | 8/2001 | Ohanian | ...................... | 702/18 |
| 6,292,754 | B1 | * | 9/2001 | Thomsen | ...................... | 702/14 |

FOREIGN PATENT DOCUMENTS

| GB | 2 217 014 A | | 10/1989 | | |
| GB | 2317954 A | * | 4/1998 | ............ | G01V/1/30 |

OTHER PUBLICATIONS

Anat Canning, Gerald H. F. Gardner, "Another look at the question of azimuth", The Leading Edge, Jul. 1996, pp. 821–823.

A.J.W. Duijndam, M.A. Schonewille, R. Romijn, E.A. Koek, L. Ongkiehong, "A general reconstruction scheme for dominant azimuth 3D seismic data", 69$^{th}$ SEG International Exposition and Annual Meeting, Expanded Abstracts, Oct. 31–Nov. 5, 1999, pp. 1441–1444, vol. II, United States of America.

Michel Albert Schonewille, "Fourier reconstruction of irregularly sampled seismic data", Delft University of Technology M.A., Ph.D. thesis, 2000, pp. 1–245, The Netherlands.

Nizar Chemingui, Anataly I. Baumstein, "Handling azimuth variations in multi–streamer marine surveys", 70$^{th}$ SEG International Exposition and Annual Meeting, Expanded Abstracts, Aug. 6–11, 2000, pp. 1–4, vol. I, United States of America.

Mauricio D. Sacchi, Tadeusz J. Ulrych, "High–resolution velocity gathers and offset space reconstruction", GEOPHYSICS, Jul.–Aug. 1995, pp. 1169–1177, vol. 60, No. 4.

* cited by examiner

Primary Examiner—Donald McElheny, Jr.
(74) Attorney, Agent, or Firm—E. Eugene Thigpen; Charles R. Schweppe

(57) ABSTRACT

A seismic data set is processed by applying a transform to the seismic data set that corrects for time shifts in the seismic data set resulting from azimuthal variation. Alternatively, a seismic data set is sorted to common offset gathers. Then, the following steps are applied to each common offset gather: A transform is applied to the common offset gather that corrects for time shifts in the common offset gather resulting from azimuthal variation. The transformed common offset gather is inverse transformed.

36 Claims, 10 Drawing Sheets

METHOD OF CORRECTING FOR TIME SHIFTS IN SEISMIC DATA RESULTING FROM AZIMUTHAL VARIATION

BACKGROUND OF THE INVENTION

1. Field of the Invention

This invention relates generally to the field of geophysical prospecting. More particularly, the invention relates to the field of seismic data processing. Specifically, the invention is a method of correcting for time shifts in seismic data resulting from azimuthal variation.

2. Description of the Related Art

Current seismic data acquisition leads to seismic data being irregularly sampled along the spatial coordinates. For conventional seismic data sets, these coordinates are typically the in-line midpoint, cross-line midpoint, offset and azimuth. This irregular sampling can generate problems for time-lapse seismic and imaging, including pre-stack imaging. The irregular sampling in midpoints and offset can be regularized using conventional regularization or reconstruction techniques, such as Fourier regularization. These regularization techniques calculate or estimate new values for the in-line midpoint, cross-line midpoint, and offset variables so that these variables are regularly sampled. However, these techniques, including Fourier regularization, do not compensate for variation in the azimuth variable. Nonetheless, azimuthal variations can have a large influence on the processing of seismic data.

If a single dipping layer in a homogeneous subsurface is considered, and two traces are compared with the same midpoint and absolute offset, but different azimuths, then the reflection event will shift in time. The time shift is dependent on the dip-angle and direction of the layer, the velocity in the subsurface, the azimuth, and the offset. These time shifts due to azimuth variations are limited, typically in the order of a few milliseconds. Thus, for general seismic data imaging needs, neglecting these time shifts will have limited consequences. However, for time-lapse data, where base and monitor surveys are differenced, even a time shift of 4 ms can lead to errors of the same magnitude as the difference in the measured signals. For steeply dipping layers, in particular with oblique dip-directions, neglecting azimuth variation is not an effective approach for time-lapse data. Here, repeatability is essential.

After Fourier regularization, the in-line and cross-line midpoints and absolute offsets in the regularized traces are regularly sampled. For several further processing methods, such as dip-moveout correction and prestack migration, the source and receiver coordinates are needed. To derive these positions from the midpoint and offset positions, an azimuth is needed. One approach is to assume that the azimuth is zero relative to the in-line direction. This is the sailing direction in a marine seismic survey. However, assuming a zero azimuth relative to the sailing direction is not ideal, because the seismic signal will depend on the azimuth. In principle, if the azimuth is changed, the data should be corrected for this particular change in azimuth. Another approach is to assume that each new regularized trace has almost the same azimuth as the closest input trace. Estimating azimuths by the closest input trace is physically more correct than assuming a zero azimuth relative to the sailing direction. However, this azimuth estimation approach can lead to problems in further processing algorithms. For example, it is desirable for dip-moveout correction and prestack migration to have data that is regularly sampled in midpoint, offset and azimuth. This is discussed by Canning, A. and Gardner, G. H. F., 1996, "Another look at the question of azimuth:" The Leading Edge, 15, no. 07, 821–823.

Duijndam, A. J. W. et al., 1999, "A general reconstruction scheme for dominant azimuth 3D seismic data", 69th Ann. Internat. Mtg: Soc. of Expl. Geophys., Expanded Abstracts, describe a method for reconstructing (regularizing) irregularly sampled seismic data, employing Fourier or Radon regularization. Their reconstruction scheme comprises reposting the data along receiver lines to exact cross-line positions, followed by least squares reconstruction in the midpoint-offset domain along cross-lines and after NMO correction. They assume the case of seismic data acquisition with a predominant azimuth for long offsets. However, they ignore azimuth variation.

Duijndam, A. J. W. et al., point out that an effective regularization scheme would have a number of beneficial applications in seismic data processing. It could improve the generation of pseudo zero-offset data for conventional bin-stack techniques. It could regularize and generate missing data for prestack processing that requires dense and regular sampling, such as three-dimensional prestack imaging and three-dimensional surface related multiple attenuation. It could improve the match of time-lapse seismic data and improve amplitude versus angle (AVA) analysis. It could improve coherent noise attenuation on prestack data, allowing high-resolution migration of single common offset data volumes.

Thus, a need exists for a regularization method for irregularly sampled seismic data that provides corrections for the time shifts due to azimuth variations. This will improve the repeatability of time-lapse seismic data sampling and processing.

BRIEF SUMMARY OF THE INVENTION

The invention is a method for correcting for time shifts in seismic data resulting from azimuthal variation. A seismic data set is processed by applying a transform to the seismic data set that corrects for time shifts in the seismic data set resulting from azimuthal variation.

Alternatively, a seismic data set is sorted to common offset gathers. Then, the following steps are applied to each common offset gather: A transform is applied to the common offset gather that corrects for time shifts in the common offset gather resulting from azimuthal variation. The transformed common offset gather is inverse transformed.

BRIEF DESCRIPTION OF THE DRAWINGS

The invention and its advantages may be more easily understood by reference to the following detailed description and the attached drawings, in which.

DETAILED DESCRIPTION OF THE INVENTION

Figure 2:
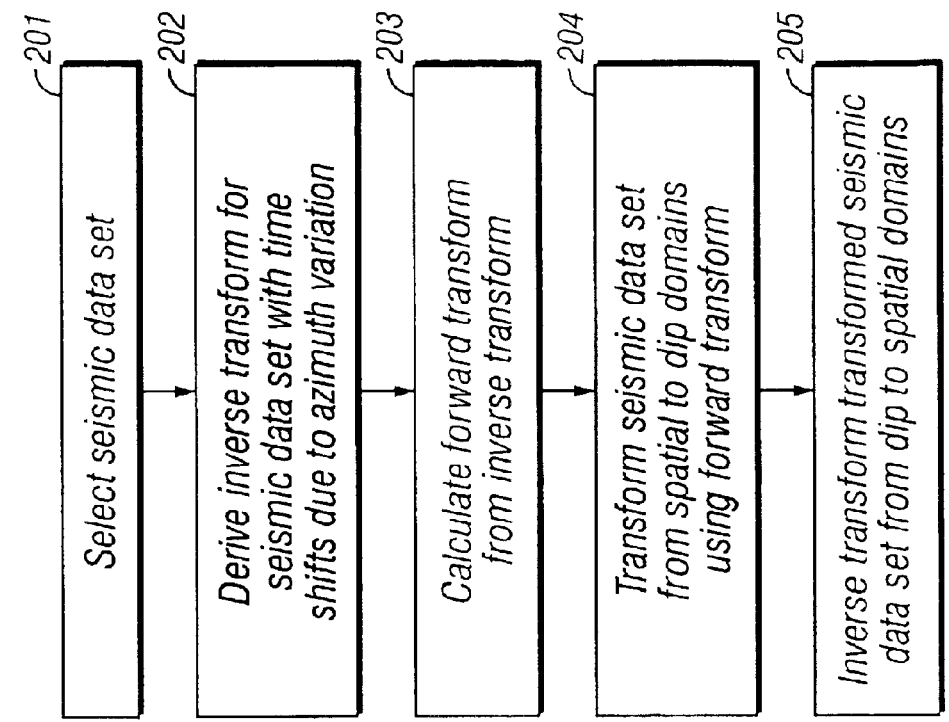
FIG. 2 is a flowchart illustrating the processing steps of an embodiment of the method of the invention for processing seismic data with at least two spatial coordinates and one time coordinate, correcting for time shifts in the seismic data resulting from azimuthal variation.

The invention is a method of processing seismic data for correcting for time shifts in the seismic data resulting from azimuthal variation. In particular embodiments, the invention is a method for regularization of seismic data while correcting for time shifts in the seismic data resulting from azimuthal variation.

Seismic data comes in different forms, depending upon how it is collected. The processed data in a standard 2D seismic data set contains two coordinates that can represent an image of a two-dimensional slice of the earth, but only after being processed. The raw data for a 2D seismic data set is typically collected with three coordinates, however. These comprise two spatial coordinates and one time coordinate. The one time coordinate is typically a two-way travel time of a seismic wavefield from a seismic source position to a seismic receiver position laid out on a one-dimensional line. The two spatial coordinates are typically the two corresponding positions, defined by one coordinate each, of the seismic source and the seismic receiver on the one-dimensional line along which the data is collected. For instance, this line could be a streamer line in marine seismic data prospecting. This line is then usually taken as a one-dimensional coordinate axis, and the spatial coordinates are then defined along this horizontal coordinate axis, for simplicity.

In standard processing for a 2D seismic data set, the two spatial coordinates in the raw data are converted to one spatial coordinate. This one spatial coordinate is typically the one coordinate of the midpoint of the source and receiver positions along the defining one-dimensional coordinate axis. The one time coordinate may remain as a time coordinate or be converted to depth, another spatial coordinate, but in the vertical direction. Thus, only after processing is the raw seismic data with three coordinates converted to a 2D seismic data set with two coordinates.

Similarly, the processed data in a standard 3D seismic data set contains three coordinates, but again, only after processing. The raw data for a 3D seismic data set is typically collected with five coordinates comprising four spatial coordinates and one time coordinate. The one time coordinate is again typically a two-way travel time of a seismic wavefield from a seismic source position to a seismic receiver position, this time located in a two-dimensional area. The four spatial coordinates are typically the corresponding two-coordinate positions of the seismic source and the seismic receiver on a two-dimensional surface area over which the data is collected. For instance, this surface area could be the area effectively studied by a span of streamer lines in marine seismic data prospecting. This area is then usually used to define a two-dimensional system of two coordinate axes and the spatial coordinates are then defined along these two horizontal coordinate axes, for simplicity.

Typically, this coordinate system is a Cartesian coordinate system in which the collection of the raw data for the seismic data set is easily described. Typically, this coordinate system would be defined by the in-line and cross-line directions of the seismic survey in which the raw seismic data were collected. Thus, the first spatial coordinate axis would typically be in the in-line direction and the second spatial coordinate axis would then be in the cross-line direction. This coordinate axes representation, however, is not a restriction on the method of the invention.

In standard seismic data processing for a 3D seismic data set, the four spatial coordinates are converted to two spatial coordinates. These two spatial coordinates are typically the two coordinates of the midpoint of the source and receiver positions. Again, the one time coordinate may remain as a time coordinate or be converted to depth, another spatial coordinate in the vertical direction.

Alternatively, the raw data in a 3D seismic data set may be represented by five different coordinates. There is, again, the one time coordinate, but four different spatial coordinates. These four spatial coordinates are the two coordinates for a midpoint, an offset coordinate, and an azimuth coordinate. The first and second midpoint coordinates are point coordinates, the offset coordinate is a length coordinate, and the azimuth coordinate is an angle coordinate. Thus, this is now a combination of a Cartesian coordinate system for the first and second midpoint coordinates and a polar coordinate system for the offset coordinate and the azimuth coordinate.

In general, a 1-D regularization method regularizes one irregularly sampled spatial coordinate in a seismic data set with at least one spatial coordinate and one time coordinate. There can be additional spatial coordinates present that are not being regularized. Similarly, a 2-D regularization method regularizes two irregularly sampled spatial coordinates in a seismic data set with at least two spatial coordinates and one time coordinate, while a 3-D regularization method regularizes three irregularly sampled spatial coordinates in a seismic data set with at least three spatial coordinates and one time coordinate. The method of the invention will be described by embodiments that include a 2D regularization method and a 3D regularization method.

A conventional method for regularization of seismic data is Fourier regularization. Fourier regularization, however, does not correct for time shifts in the seismic data resulting from azimuthal variation. The method of the invention does correct for time shifts in the seismic data resulting from azimuthal variation. As an aid to understanding the present invention and differentiating the present invention from the prior art, conventional 2D Fourier regularization will first be described with reference to FIG. 1. Then, an embodiment of the present invention will be described with reference to FIG. 2.

Figure 1:
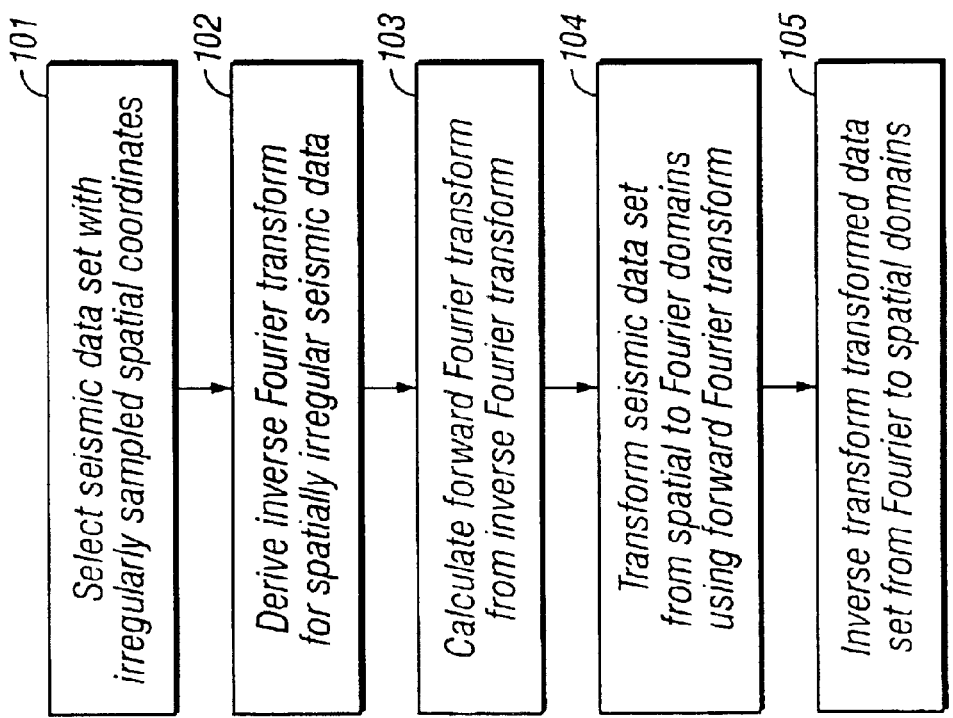
FIG. 1 is a flowchart illustrating the processing steps of a conventional method for Fourier regularization of seismic data with at least two irregularly sampled spatial coordinates and one time coordinate.

FIG. 1 shows a flowchart illustrating the typical processing steps of a conventional method for regularization of seismic data with at least two irregularly sampled spatial coordinates and one time coordinate. The following discussion of FIG. 1 will give a short overview of this conventional method. The conventional method will be described in terms of Fourier transforms and inverses. For further discussion, see Duijndam et al. (1999), discussed above, and Schonewille, M. A., Ph.D. thesis, "Fourier reconstruction of irregularly sampled seismic data", Delft University of Technology, 2000.

At step 101, a seismic data set is selected for regularization. The seismic data set is selected with at least two spatial coordinates and one time coordinate. The two spatial coordinates will be called the first and second spatial coordinates. The first and second spatial coordinates will be represented by the variables x and y, respectively. The time coordinate could be represented by the travel time t. The time coordinate could alternatively be converted to depth z, using knowledge or estimates of the acoustic velocity in the local media. Here, however, the time coordinate will be represented by the temporal frequency $\omega$. This representation will facilitate the equations used to describe the regularization method. Thus, the seismic data set is defined in the (x, y, $\omega$) domain. The (x, y, $\omega$) domain will here be called the spatial domain.

The seismic data set is typically a gather of recorded seismic traces. Here, the gather of recorded seismic traces in the seismic data set may be irregularly sampled in the first and second spatial coordinates. This means that the positions of the x and y coordinates of the seismic traces may be irregularly spaced. Because the seismic data set may be irregularly sampled, a special forward Fourier transform is calculated to handle the irregularly sampled data.

At step 102, an inverse Fourier transform for irregularly sampled data is derived for the seismic data set selected in step 101. This inverse Fourier transform transforms data from the ($k_x$, $k_y$, $\omega$) domain to irregularly sampled seismic data in the spatial domain. The ($k_x$, $k_y$, $\omega$) domain is here called the Fourier domain. Here, $k_x$ and $k_y$ are the wave numbers corresponding to the first and second spatial coordinates x and y. The derivation of this inverse Fourier transform starts with the standard discrete inverse Fourier transform, which is well known in the art. One embodiment is given by:

$$P(x, y, \omega) = \frac{\Delta k_x \Delta k_y}{4\pi^2} \sum_{m=-M}^{M} \sum_{l=-L}^{L} \tilde{P}(m\,\Delta k_x, l\,\Delta k_y, \omega) \exp[-j(m\,\Delta k_x x + l\,\Delta k_y y)]. \quad (1)$$

Here, P(x, y, $\omega$) is a function representing the seismic data in the spatial domain and $\tilde{P}(k_x, k_y, \omega)$ is a function representing the transformed seismic data in the Fourier domain. The variables $\Delta k_x$ and $\Delta k_y$ are regular sample intervals in the $k_x$ and $k_y$ coordinate directions, respectively, in the Fourier domain. The term exp[x] is an alternate (more easily read) formulation of the exponential function $e^x$.

The inverse Fourier transform given by Equation (1) is defined for regularly sampled seismic data in the Fourier domain, but is valid for any spatial position defined by the first and second spatial coordinates x and y in the spatial domain. Therefore, this inverse transform is capable of transforming the irregularly sampled seismic data set selected in step 101.

Further, in the formulation of the inverse Fourier transform given in Equation (1), all combinations of m and l are specified. This means that a rectangular area in the Fourier domain is used. This area is called a rectangular "region of support". This restriction to a rectangular area is not necessary. Indeed, choosing a straightforward rectangular region of support may yield too many parameters, even leading to a formulation with matrices that cannot be inverted. Therefore, in a least squares inversion, it can be advantageous to reduce the number of Fourier coefficients that are computed.

Thus, an inverse Fourier transform for the irregularly sampled seismic data selected in step 101 is derived from the inverse Fourier transform for regularly sampled data defined in Equation (1). This can be accomplished by rewriting Equation (1) as:

$$P(x, y, \omega) = \frac{\Delta k_x \Delta k_y}{4\pi^2} \sum_{r=-R}^{R} \tilde{P}(k_{x,r}, k_{y,r}, \omega)\exp[-j(k_{x,r}x + k_{y,r}y)]. \quad (2)$$

Here, $k_{x,r}$ and $k_{y,r}$ are the wave numbers corresponding to the 2R+1 sampled points $(k_{x,r}, k_{y,r})$ for $r=-R, \ldots, R$, in the Fourier domain.

It can be noted that, Equation (2) may be more generally expressed as:

$$P(x, y, \omega) = \frac{\Delta k_x \Delta k_y}{4\pi^2} \sum_{r=-R}^{R} \tilde{P}(k_{x,r}, k_{y,r}, \omega)\exp[-j(k_{x,r}x_r^n + k_{y,r}y_r^n)]. \quad (3)$$

The power n can take on the value n=1 or n=2 in Equation (3). The power n=1 represents either a linear Fourier transform or a linear Radon transform over the offset axis. The power n=2 represents a Fourier transform with a quadratic stretching of the offset axis or a parabolic Radon transform. For the linear Radon transform, $k_x = \omega p_x$, where $p_x$ is the slowness parameter in the x direction. For the quadratic Fourier transform or parabolic Radon transform, $k_x = \omega q_x$, where $q_x$ is the curvature in the x direction. Similar definitions apply to $k_y$. See Duijndam et al. (1999), discussed above, for further details. However, for clarity, the remaining discussion of the conventional regularization method in FIG. 1 will be illustrated by Fourier transforms.

At step 103, a forward Fourier transform is calculated from the inverse Fourier transform derived in step 102. This forward Fourier transform transforms seismic data in the spatial domain to the Fourier domain. Since the inverse Fourier transform from step 102 was derived for irregularly sampled seismic data in the spatial domain, the forward Fourier transform also applies to irregularly sampled seismic data in the spatial domain.

This calculation of the forward Fourier transform is typically carried out by a least squares inversion. This least squares inversion is well known in the art and will be only briefly described here.

Equation (2) can be rewritten in matrix-vector notation for K irregularly sampled sample locations $(x_k, y_k)$ for $k=0, \ldots, K-1$, in the spatial domain, as:

$$p = A\tilde{p}. \quad (4)$$

Here, the vector elements of p are given by $$p_k = P(x_k, y_k, \omega) \quad (5)$$

for $k=0, \ldots, K-1$; the vector elements of $\tilde{p}$ are given by $$\tilde{p}_r = \tilde{P}(p_{x,r}, p_{y,r}, \omega) \quad (6)$$

for $r=-R, \ldots, R$; and the matrix elements of A are given by $$A_{kr} = \frac{\Delta k_x \Delta k_y}{4\pi^2}\exp[-j(k_{x,r}x_k + k_{y,r}y_k)]. \quad (7)$$

for $k=0, \ldots, K-1$ and $r=-R, \ldots, R$.

For band-limited seismic data within the region of support, Equation (7) would be exact. In practice, however, the seismic data are usually not exactly band-limited. The seismic data components outside the specified bandwidth constitute the noise in the forward model and should be incorporated into a noise term n. Then Equation (7) becomes:

$$p = A\tilde{p} + n. \quad (8)$$

Equation (8) represents a forward model for the seismic data, and is a 2D transform from the Fourier domain to the spatial domain. To obtain the desired transformation of the data from the (irregularly sampled) spatial domain to the Fourier domain, a least squares inversion of Equation (8) is used:

$$\tilde{p} = (A^H A)^{-1} A^H p, \quad (9)$$

where $\tilde{p}$ is the least squares estimation of the Fourier spectrum of the irregularly sampled data p.

If the region of support is rectangular, then the matrix:

$$T = A^H A \quad (10)$$

has a Block Toeplitz Toeplitz Block (BTTB) structure, for which fast inversion schemes are well known in the art. If the region of support is a subset of the rectangular region of support, then the BTTB structure can still be used in a conjugate gradient scheme, by masking the extra Fourier coefficients, as is well known in the art. The non-uniform discrete Fourier transform can be computed using a non-uniform fast Fourier transform. The least squares formulation in Equation (9) is extended to include weighting and diagonal stabilization techniques.

Referring again to FIG. 1, at step 104, the seismic data set selected in step 101 is transformed from the spatial domain to the Fourier domain. This transformation is accomplished using the forward Fourier transform calculated in step 103. This transformation generates a Fourier transformed data set.

At step 105, the Fourier transformed data set from step 104 is inverse transformed from the Fourier domain back to the spatial domain. This inverse transformation is typically done by an inverse Fourier transform. The inverse Fourier transform is typically an inverse discrete Fourier transform or, alternatively, an inverse fast Fourier transform. Both of these inverse Fourier transforms are well known in the art. This inverse transformation generates an inverse Fourier transformed data set. The transformed seismic traces in the inverse Fourier transformed seismic data set will now be regularly sampled.

The conventional method of 2D Fourier regularization described with reference to FIG. 1 does not correct for time shifts in the seismic data resulting from azimuthal variation. However, an embodiment of the method of the invention that does correct for time shifts in a seismic data set resulting from azimuthal variation will now be described with reference to FIG. 2. This embodiment of the method of the invention can also regularize irregularly sampled seismic data, although regularization is not a requirement of the method of the present invention.

FIG. 2 shows a flowchart illustrating the processing steps of an embodiment of the method of the invention for processing seismic data with at least two spatial coordinates and one time coordinate, correcting for time shifts in the seismic data resulting from azimuthal variation.

At step 201, a seismic data set is selected for regularization. The seismic data set is selected as a raw seismic data set with at least two spatial coordinates and one time coordinate. The two spatial coordinates will be called the first and second spatial coordinates. The first and second spatial coordinates will be represented by the variables x and y, respectively. Typically, the first and second spatial coordinates will be oriented in the in-line and cross-line directions of the seismic survey in which the seismic data set is collected, but this is not a limitation of the invention. The time coordinate could be represented by the travel time t or could alternatively be converted to depth z, using knowledge or estimates of the acoustic velocity in the local media. Here, however, the time coordinate will be represented by the temporal frequency ω. This representation will facilitate the equations used to describe the regularization method. Thus, the seismic data set is defined in the (x, y, ω) domain. The (x, y, ω) domain will here be called the spatial domain.

The seismic data set is typically a gather of recorded seismic traces. Here, the gather of recorded seismic traces in the seismic data set may be irregularly sampled in one or both of the first and second spatial coordinates. However, this is not a limitation of the invention. The method of the invention may be applied to seismic data sets in which one or both of the first and second spatial coordinates are regularly sampled. The method of the invention still provides azimuth time-shift correction, whether the spatial coordinates are regularly or irregularly sampled. The method of the invention will be illustrated by the case of irregularly sampled data, but this is for illustrative purposes only, and is not intended as a limitation of the invention.

At step 202, an inverse transform that corrects for time shifts in seismic data resulting from azimuthal variation and is capable of transforming irregularly sampled seismic data is derived for the seismic data set selected in step 201. The inverse transform is preferably an inverse Radon transform, but this is not a limitation of the invention. This inverse transform transforms possibly irregularly sampled seismic data in a dip domain to regularly sampled seismic data in the spatial domain. In the preferred case of an inverse Radon transform, this is a transform from the $(p_x, p_y, \omega)$ domain to the spatial domain. The $(p_x, p_y, \omega)$ domain is often called the Radon domain. Here, $p_x$ and $p_y$ are the slowness parameters, which represent dips, corresponding to the first and second spatial coordinates x and y. Typically, $p_x$ and $p_y$ represent dips in the in-line and cross-line directions, respectively, but this is not a limitation of the method of the invention.

The derivation of this inverse transform will be illustrated by the case of an inverse Radon transform, but this is for illustrative purposes only, and is not intended as a limitation of the invention. Any inverse transform that transforms seismic data from a dip domain to the spatial domain is intended to be included in the method of the present invention. The derivation of an inverse Radon transform starts with the standard discrete inverse Radon transform for regularly sampled seismic data, which is well known in the art. One embodiment is given by:

$$P(x, y, \omega) = \frac{\Delta p_x \Delta p_y}{4\pi^2} \sum_{m=-M}^{M} \sum_{l=-L}^{L} \tilde{P}(m\,\Delta p_x, l\,\Delta p_y, \omega)\exp[-j\omega(m\,\Delta p_x x + l\,\Delta p_y y)]. \quad (11)$$

Here, P is a function representing the seismic data in the spatial domain and $\tilde{P}$ is a function representing the transformed seismic data in the Radon domain. The variables $\Delta p_x$ and $\Delta p_y$ are regular sample intervals in the $p_x$ and $p_y$ coordinate directions, respectively, in the Radon domain. Typically, the $p_x$ and $p_y$ coordinate directions are the in-line and cross-line directions, respectively, but this is not a limitation of the method of the invention.

Next, an inverse Radon transform that is capable of transforming irregularly sampled seismic data is derived from the inverse Radon transform for regularly sampled data given by Equation (11). This inverse Radon transform transforms regularly sampled seismic data in the Radon domain to possibly irregularly sampled seismic data in the spatial domain. The derivation of this inverse Radon transform can be accomplished by rewriting Equation (11) as:

$$P(x, y, \omega) = \frac{\Delta p_x \Delta p_y}{4\pi^2} \sum_{r=-R}^{R} \tilde{P}(p_{x,r}, p_{y,r}, \omega)\exp[-j\omega(p_{x,r}x + p_{y,r}y)], \quad (12)$$

where, $p_{x,r}$ and $p_{y,r}$ are the wave numbers corresponding to the 2R+1 sampled points $(k_{x,r}, k_{y,r})$ for $r = -R, \ldots, R$, in the Radon domain.

Next, an inverse Radon transform that corrects for time shifts in seismic data resulting from azimuthal variation and is capable of transforming possibly irregularly sampled seismic data is derived from the inverse Radon transform for the irregularly sampled data given by Equation (12). A time shift $\Delta t$ in the spatial domain transforms to a linear phase shift in the frequency domain, which corresponds to a multiplication by $e^{-j\omega\Delta t}$. Therefore, a forward Radon transform for irregularly sampled seismic data with a time shift correction is given by rewriting Equation (12) as:

$$P(x, y, \omega) = \quad (13)$$

$$\frac{\Delta p_x \Delta p_y}{4\pi^2} \sum_{r=-R}^{R} \tilde{P}(p_{x,r}, p_{y,r}, \omega)\exp[-j\omega(p_{x,r}x + p_{y,r}y + \Delta t)].$$

Note that the time shift can be a function of any "known" parameter. As an example that illustrates, but does not limit, the method of the invention, time shift can be a function of the variables describing the trace position (e.g. shot coordinates x, y, receiver coordinates x, y, and offset coordinate h) and the slowness parameters in both directions $(p_x, p_y)$. In other words, $$\Delta t = f(x_s, y_s, x_r, y_r, h, p_x, p_y). \quad (14)$$

Next, an inverse Radon transform for possibly irregularly sampled seismic data with a time shift correction for a dipping layer in a homogeneous subsurface is derived from the inverse Radon transform for possibly irregularly sampled data with a time shift correction, as given by Equation (13). Consider time-shifts in the two different arrival times, $t_1$ and $t_2$, of a reflection event, due to azimuth variations for a single dipping layer in a homogeneous subsurface. Chemingui, N., and Baumstein, A. I., "Handling azimuth variations in multi-streamer marine surveys", 2000, 70th Ann. Internat. Mtg: Soc. of Expl. Geophys., Expanded Abstracts, p. 1-4, give the following formula for the time shift in this situation:

$$\Delta t = t_2 - t_1 \approx -\frac{2h^2}{v^2 t_1}\sin^2(\phi)\sin(\psi_2 - \psi_1)\sin(\psi_1 + \psi_2 - 2\theta), \quad (15)$$

where h is the half-offset, v is the velocity, $\phi$ is the dip angle, $\psi_1$ and $\psi_2$ are the first and second azimuths in the first and second coordinate directions, respectively, and $\theta$ is the dip direction. Typically, $\psi_1$ and $\psi_2$ are azimuths in the in-line and cross-line directions, respectively, but this is not a limitation of the method of the invention.

From Equation (15), it can be observed that the time shifts due to azimuth variation become larger for larger offsets, for lower velocity, for smaller $t_1$, for steeper dips, for bigger azimuth differences (up to $\psi_2-\psi_1=\pi/2$, then the time-shifts become smaller again), and for bigger differences between the dip-direction $\theta$ and the average survey azimuth $(\psi_1+\psi_2)/2$, up to $\pi/4$ (oblique dip). For larger differences, the time-shifts become smaller again.

Furthermore, if the difference between the average survey azimuth and the dip-direction θ is zero (in-line dip) or if it is π/4 (cross-line dip), then time shifts become very small. Exact cross-line and in-line dips are therefore not representative when studying effects where azimuth variations are important. The time shifts seem strongly dependent on offset, however it should be realized that for larger offsets, the azimuth variation often becomes smaller (in particular for marine surveys), which counteracts the overall effect. The time shifts also seem strongly dependent on velocity, but note that for a layer at a certain depth, $t_1$ will become smaller if the velocity increases, again counteracting the overall effect. The time shift is strongly dependent on the dip angle.

The velocity, dip-angle and dip direction are not known, and therefore this formula in Equation (15) has to be adapted such that it depends on the variables whose measured values are known, such as $x_s$, $y_s$, $x_r$, $y_r$, h, $p_x$ and $p_y$. The following steps are preferably used to adapt Equation (15). The slowness parameters can be transformed into polar coordinates given by the absolute slowness $$|p| = \sqrt{p_x^2 + p_y^2} \qquad (16)$$

and the slowness direction $$p_\theta = \text{sign}(p_y)\cos^{-1}(p_x/|p|), \qquad (17)$$

where $\text{sign}(p_y) = 1$ for $p_y \geq 0$ and $\text{sign}(p_y) = -1$ for $p_y < 0$. For a single dipping layer in a homogeneous subsurface, the dip direction is equal to the slowness direction if x and y relate to the midpoints for a constant offset section. For zero offset, $2 \sin(\phi)/v$ is equal to the absolute slowness $|p|$, or $$(\sin(\phi)/v)^2 = |p|^2. \qquad (18)$$

Then, the first azimuth can be derived from the shot and receiver positions and the second azimuth is chosen to be zero, relative to the first coordinate direction, typically the in-line direction. Alternatively, the first azimuth could be chosen to be zero, relative to the second coordinate direction, typically the cross-line direction. Aligning the first and second azimuths in the in-line and cross-line directions is for illustrative purposes only, and is not intended as a limitation of the invention. Azimuth corrections can be done in any desired direction.

Using these substitutions given by Equations (16)–(18), the formula for the time-shift in Equation (15) becomes:

$$\Delta t \approx \frac{h^2}{2t_1}|p|^2 \sin(-\psi_1)\sin(\psi_1 - 2p_\theta). \qquad (19)$$

The inverse Radon transform with time-shift correction can now be given by rewriting Equation (11) as:

$$P(x, y, \omega) = \frac{\Delta p_x \Delta p_y}{4\pi^2} \sum_{r=-R}^{R} \tilde{P}(p_{x,r}, p_{y,r}, \omega) \times \qquad (20)$$

$$\exp\left[-j\omega\left(p_{x,r}x + p_{y,r}y + \frac{h^2}{2t_1}|p|^2\sin(-\psi_1)\sin(\psi_1 - 2p_\theta)\right)\right].$$

Note that the time shifts are dependent on the arrival time $t_1$. Since the computations are done with frequencies in the Radon domain, a sliding time-window approach with overlapping time windows is preferred. Similarly, the use of a sliding window approach with overlapping spatial windows is preferred.

Referring again to FIG. 2, at step 203, a forward transform is calculated from the inverse transform derived in step 202. This forward transform is preferably a forward Radon transform for the preferred inverse Radon transform discussed above. This forward transform transforms seismic data in the spatial domain to the dip domain. Since the inverse transform from step 202 was derived to correct for time shifts in the seismic data resulting from azimuthal variations, the forward transform also corrects for time shifts in the seismic data resulting from azimuthal variations. In the case that one or both of the first and second spatial coordinates in the seismic data set were possibly irregularly sampled, then the inverse transform from step 202 was derived for possibly irregularly sampled seismic data in the spatial domain. In this case, the forward transform also applies to possibly irregularly sampled seismic data in the spatial domain.

The calculation of the forward transform will be illustrated by the calculation of a forward Radon transform from the inverse Radon transform discussed above, but this is for illustrative purposes only, and is not intended as a limitation of the invention. This calculation of the forward Radon transform is preferably carried out by a least squares inversion. Equation (2) can be rewritten in matrix-vector notation for K irregularly sampled sample locations $(x_k, y_k)$, for $k=0, \ldots, K-1$, in the spatial domain, as:

$$p = A\tilde{p}, \qquad (21)$$

Here, the vector elements of p are given by $$p_k = P(x_k, y_k, \omega) \qquad (22)$$

for $k=0, \ldots, K-1$; the vector elements of $\tilde{p}$ are given by $$\tilde{p}_r = P(p_{x,r}, p_{y,r}, \omega) \qquad (23)$$

for $r = -R, \ldots, R$; and the matrix elements of A are given by $$A_{kr} = \qquad (24)$$

$$\frac{\Delta p_x \Delta p_y}{4\pi^2} \exp\left[-j\left(p_{x,r}x_k + p_{y,r}y_k + \frac{h^2}{2t_1}|p|^2\sin(-\psi_1)\sin(\psi_1 - 2p_\theta)\right)\right]$$

for $k=0, \ldots, K-1$ and $r=-R, \ldots, R$.

The linear Radon transform represents the seismic data as a sum of linear dipping events. In practice, however, not all seismic data can be represented as a sum of linear dipping events. In that case, Equation (21), as defined by Equations (22)–(24), would not be exact. Thus, the data components that cannot be represented by the linear Radon transform should be incorporated into a vector noise term n. Then Equation (21) becomes:

$$p = A\tilde{p} + n \qquad (25)$$

Equation (25) represents a forward model for the seismic data, and is a 2D transform from the Radon domain to the spatial domain. To obtain the desired transformation of the data from the possibly irregularly sampled spatial domain to the Radon domain, a least squares inversion of Equation (25) is used:

$$\tilde{p} = (A^H A)^{-1} A^H p, \qquad (26)$$

where $\tilde{p}$ is the least squares estimation of the Radon spectrum of the irregularly sampled data p.

The least squares formulation in Equation (26) may be extended to include any stabilization techniques know in the art. This could include, but not be limited to, diagonal stabilization techniques, for example, which are well known in the art. Applying diagonal stabilization would change Equation (26) to the following:

$$\tilde{p} = (A^H A + kI)^{-1} A^H p, \qquad (27)$$

where k is a stabilization constant and I is the identity matrix. High-resolution stabilization methods as described, for example, in Sacchi, M. D. and Ulrych, T. J., 1995, "High resolution velocity gathers and offset space reconstruction", *Geophysics*, Vol. 60, 1169–1177, may also be applied.

Referring again to FIG. 2, at step 204, the seismic data set selected in step 201 is transformed from the spatial domain to the dip domain. Preferably, the dip domain is the Radon domain. This transformation is preferably accomplished by applying the forward transform calculated in step 203. This transformation generates a transformed data set.

At step 205, the transformed data set from step 204 is inverse transformed from the dip domain back to the spatial domain. This inverse transformation is preferably done by an inverse Radon transform. The preferred inverse Radon transform is preferably an inverse discrete Radon transform, well known in the art. This inverse transformation generates an inverse transformed data set. The transformed seismic traces in the inverse transformed seismic data set will now be corrected for time shifts in the seismic data resulting from azimuthal variation. In addition, any irregularly sampled seismic data will now be regularly sampled.

The embodiment of the method of the invention described with reference to FIG. 2 applies to seismic data sets with at least two spatial coordinates, possibly irregularly sampled, and one time coordinate. If Radon transforms are used, the embodiment of the invention described with reference to FIG. 2 may be termed 2D Radon regularization with azimuth time-shift correction. The method of the invention has an embodiment applying to seismic data sets with at least three spatial coordinates, possibly irregularly sampled, and one time coordinate which will be described with reference to FIG. 4. If Radon transforms are used, the embodiment of the invention described with reference to FIG. 4 may be termed 3D Radon regularization with azimuth time-shift correction.

As an aid to understanding the present invention and differentiating the present invention from the prior art, conventional 3D Fourier regularization will first be described with reference to FIG. 3. Then, an embodiment of the present invention will be described with reference to FIG. 4.

Figure 3:
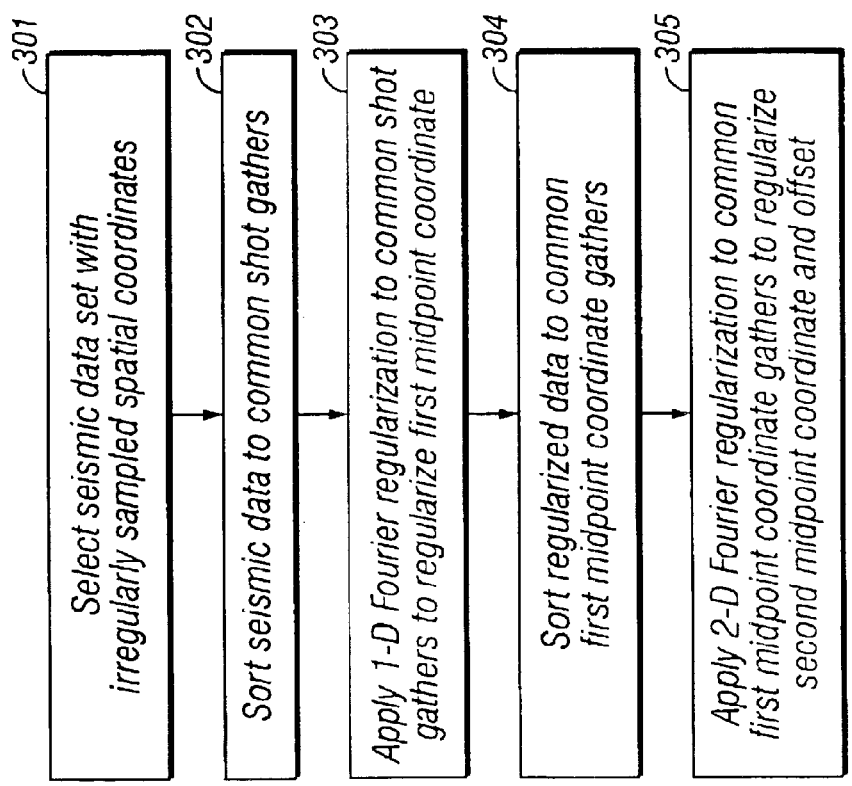
FIG. 3 is a flowchart illustrating the processing steps of a conventional method for regularization of seismic data with at least three irregularly sampled spatial coordinates and one time coordinate.

FIG. 3 shows a flowchart illustrating the typical processing steps of a conventional method for regularization of seismic data with at least three irregularly sampled spatial coordinates and one time coordinate.

At step 301, a seismic data set is selected for regularization. The seismic data set is typically selected with at least three irregularly sampled spatial coordinates and one time coordinate. Typically, the seismic data set is selected to contain two coordinates for a midpoint, an offset coordinate, and an azimuth coordinate as the four spatial coordinates. Then, the first three spatial coordinates, that is, the two midpoint coordinates and the offset coordinates, are the three spatial coordinates regularized. Variations in the fourth spatial coordinate, the azimuth coordinate, are not compensated for.

In step 302, the seismic data set selected in step 301 is sorted to common shot gathers.

In step 303, 1D regularization is applied to each common shot gather from step 302 to regularize the first midpoint coordinate. Typically, the first midpoint coordinate is the in-line midpoint coordinate. Typically, the 1D regularization applied is a 1D Fourier regularization. As a result, each in-line midpoint coordinate is repositioned substantially in the middle of the bins, in the in-line direction.

In step 304, the regularized data set from step 303 is sorted to common first midpoint coordinate gathers. These gathers will be volumes comprising the second midpoint coordinate, offset, and time. Typically, the regularized data set is sorted to "cross-lines" or common in-line midpoint coordinate gathers. These gathers are volumes comprising the cross-line midpoint coordinate, offset, and time.

In step 305, 2D regularization is applied to each common first midpoint coordinate gather from step 304. The 2D regularization is typically Fourier regularization. The two spatial dimensions being regularized are the second midpoint coordinate and the offset. Typically, the second midpoint coordinate is the cross-line midpoint coordinate, so the two spatial dimensions being regularized are the cross-line midpoint coordinate and the offset.

The conventional method of 3D Fourier regularization described with reference to FIG. 3 does not correct for time shifts in the seismic data resulting from azimuthal variation. However, an embodiment of the method of the invention that does correct for time shifts in a seismic data set resulting from azimuthal variation will now be described with reference to FIG. 4. This embodiment of the method of the invention can also regularize irregularly sampled seismic data, although regularization is not a requirement of the method of the invention.

Figure 4:
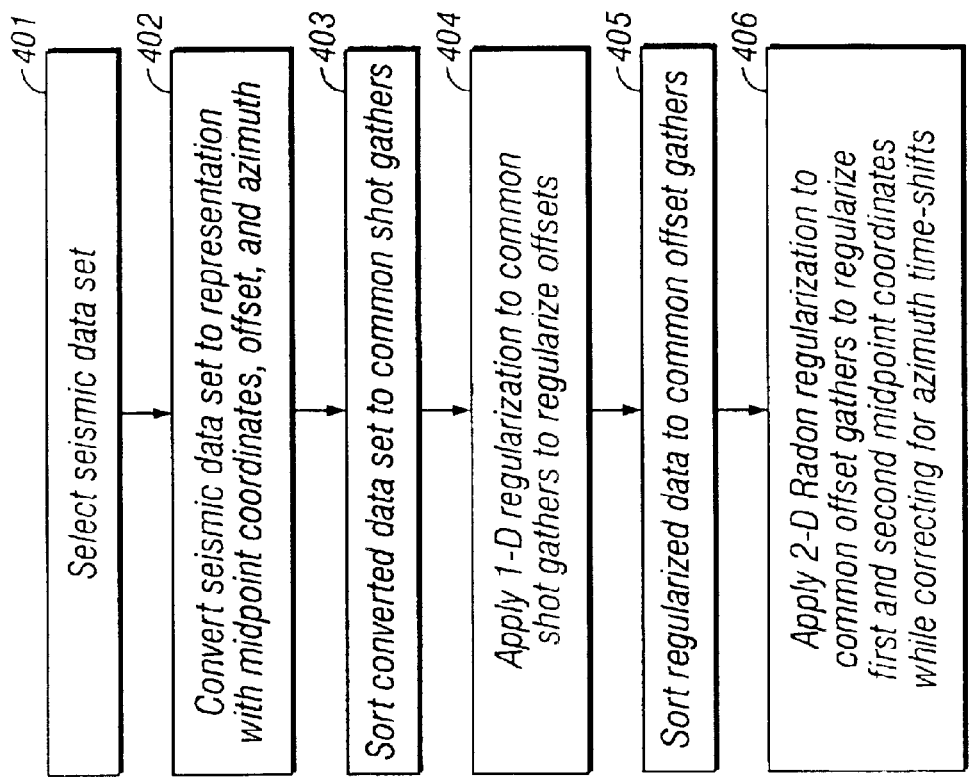
FIG. 4 is a flowchart illustrating the processing steps of an embodiment of the method of the invention for processing seismic data with at least three spatial coordinates and one time coordinate, correcting for time shifts in the seismic data resulting from azimuthal variation.

FIG. 4 shows a flowchart illustrating the processing steps of an embodiment of the method of the invention for processing seismic data with at least three spatial coordinates and one time coordinate, correcting for time shifts in the seismic data resulting from azimuthal variation.

At step 401, a seismic data set is selected for processing. The seismic data set is selected as a raw seismic data set with at least three spatial coordinates and one time coordinate.

In step 402, the seismic data set selected in step 401 is converted to a data representation in which the four spatial coordinates will be two midpoint coordinates, offset, and azimuth. The first three spatial coordinates, that is, the first and second midpoint coordinates and the offset coordinate, will be the three spatial coordinates that may be regularized, if any of the first three spatial coordinates are irregularly sampled. Regularization is not a requirement of the invention. Time shifts resulting from variation in the fourth spatial coordinate, the azimuth coordinate, will be corrected in this method of the invention. Typically, the first and second midpoint coordinates will be the in-line and cross-line midpoint coordinates, respectively, and this convention may be employed here for illustrative purposes. However, this is not a limitation on the invention. In particular, the coordinate directions may be defined so that the azimuth corrections are in any desired direction.

In step 403, the seismic data set converted in step 402 is sorted to common shot gathers.

In step 404, 1D regularization is optionally applied to each common shot gather from step 403, if regularization is desired. The optional 1D regularization applied is preferably a 1D Fourier regularization. The optional 1D regularization preferably regularizes the offset coordinate.

The 2D regularization step, step 406 below, in this 3D embodiment of the method of the invention, will preferably be performed on a data set comprising the first and second midpoint coordinates and the time coordinate. The dip parameters in a dip domain, such as, in particular, the slowness parameters $p_x$ and $p_y$ in the Radon domain, should correspond to the dips in the layers of the earth's subsurface being represented by the seismic data set. Thus, the 1D regularization step, if performed, is preferably performed on the offset coordinate.

In step 405, the data set from step 404, regularized if desired, is sorted to common offset gathers. These gathers will be volumes comprising first and second midpoint coordinates, azimuth, and time. Typically, the first and second midpoint coordinates will be the in-line and cross-line midpoint coordinates, respectively. However, this is for illustrative purposes only, and is not a limitation on the invention.

In step 406, the 2D embodiment of the method of the invention as described in reference to FIG. 2, above is applied to each common offset gather from step 405. The 2D embodiment of the method of the invention is preferably 2D Radon regularization with azimuth time-shift correction. Each common offset gather is corrected for time shifts in the seismic data resulting from azimuthal variation. As a result, the azimuth is substantially converted to zero azimuth. The azimuths are now substantially reoriented into the first midpoint coordinate direction, typically the in-line direction.

Alternatively, azimuths could be substantially reoriented into the second midpoint coordinate direction, typically the cross-line direction. Aligning the azimuths in the in-line or cross-line directions is for illustrative purposes only, and is not intended as a limitation of the invention. Azimuth corrections can be done in any desired direction.

The two spatial dimensions that may be regularized, if desired, are the first and second midpoint coordinates, typically the in-line and cross-line midpoint coordinates, respectively.

The embodiment of the method of the invention described with reference to FIG. 4 corrects seismic data with at least three spatial coordinates and one time coordinate for time shifts in the seismic data set resulting from azimuthal variation. This embodiment of the method of the invention can also regularize irregularly sampled seismic data in the at least three spatial coordinates, although regularization is not a requirement of the method of the invention.

EXAMPLES

For examples, the method of the invention will be applied to a model with a single dipping layer in a homogeneous subsurface. The data represent a time-lapse survey. The parameters describing the acquisition geometry are flip-flop shooting with a 25 meter shot interval (flip to flop), 16 streamers, 75 meter streamer separation, and no feathering. Two surveys have been modeled, representing a time-lapse measurement. The base and monitor survey are shot in the same direction, but the sail-lines are not repeated. The cross-line distance between the two surveys is 100 meters.

Figure 5:
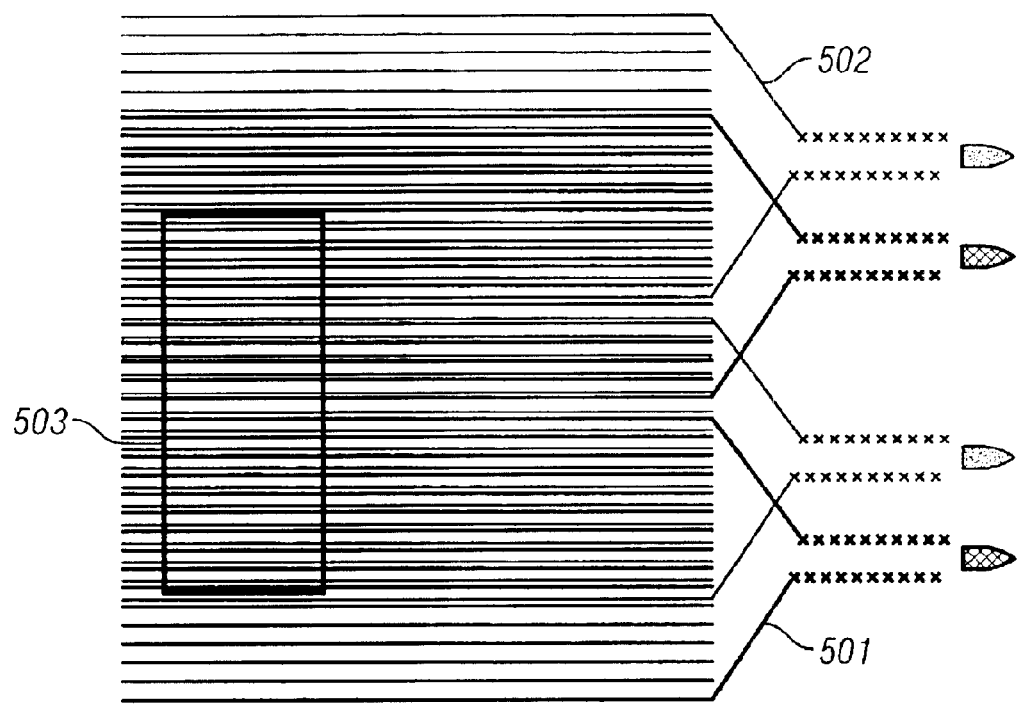
FIG. 5 is a plan view of the acquisition geometry of the base survey and monitor surveys of the example.

FIG. 5 shows a plan view of the acquisition geometry of the base survey 501 and the monitor survey 502. The black box 503 shows the part that is used for the regularization. A common offset section is used.

Figure 6:
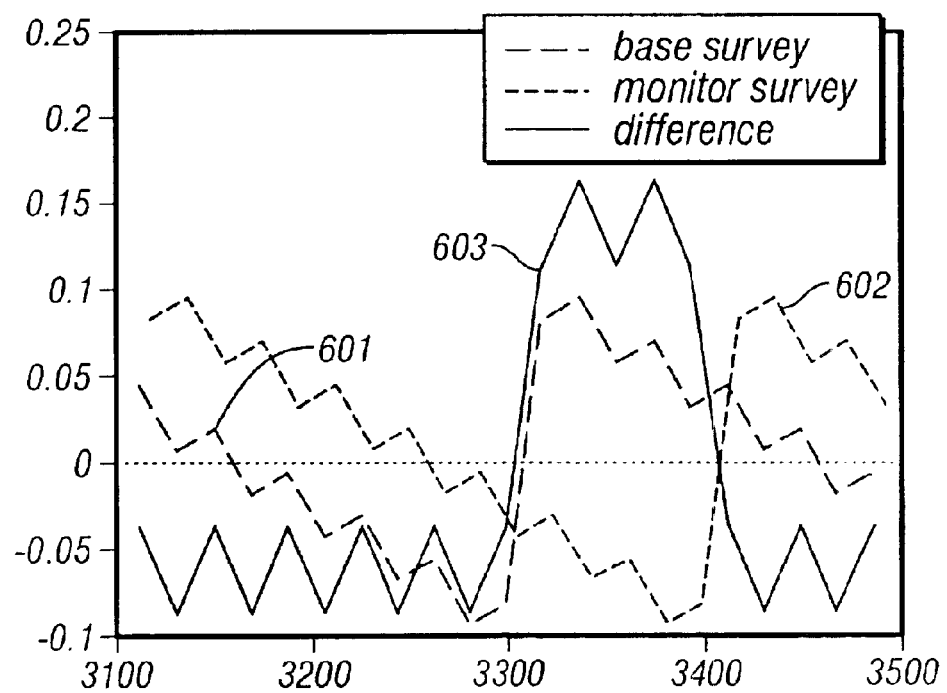
FIG. 6 is a plot of the azimuth variations versus the cross-line coordinate in the base and monitor surveys for the acquisition geometry shown in FIG. 5.

FIG. 6 shows a plot of the azimuth variations versus the cross-line coordinate in the base and monitor surveys for the acquisition geometry shown in FIG. 5. FIG. 6 shows the azimuth. variation for the base survey 601 for a cross-line, the azimuth variation for the monitor survey 602, and the difference between the two azimuth variations 603.

In the example, the method of the invention is applied to a homogeneous subsurface with single dipping layer. Here, one dipping layer with 7 degrees dip and a 45 degrees dip direction is used. A common offset section of 2000 m is chosen. The velocity is 1480 m/s, and the depth is around 1000 m. FIGS. 7a and 7b, 8a and 8b, and 9a and 9b show the results of regularization without azimuth time-shift correction. FIGS. 10a and 10b, 11a and 11b, and 12a and 12b show the corresponding results of regularization with azimuth time-shift correction.

Figure 7A:
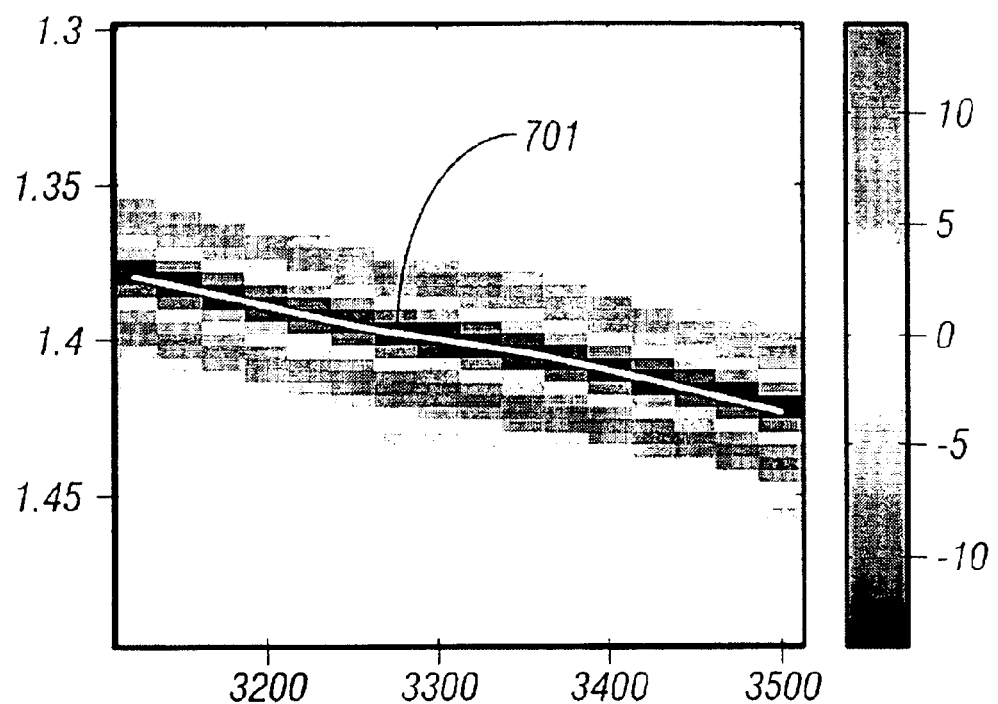
FIG. 7a is a cross-section in the cross-line direction for the common offset section of 2000 meters for the base survey after regularization without azimuth correction.
Figure 7B:
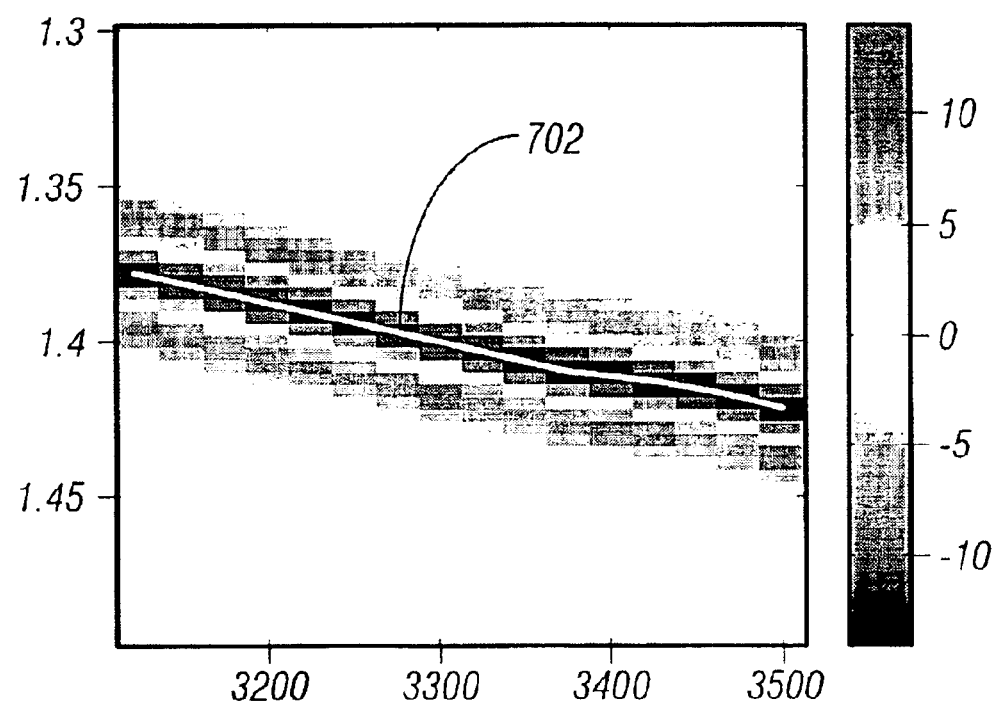
FIG. 7b is a cross-section in the cross-line direction for the common offset section of 2000 meters for the monitor survey after regularization without azimuth correction.

FIGS. 7a and 7b show cross-sections in the cross-line direction for the common offset section of 2000 meters after conventional regularization without azimuth time-shift correction. FIG. 7a shows the cross-lines for the base survey and FIG. 7b shows the cross-lines for the monitor survey. The times for maximum amplitude are picked after sub-sampling, such that the precision is better than the sample interval of 4 ms. The lines 701 in FIG. 7a and 702 in FIG. 7b show the time for the maximum amplitude.

Figure 8A:
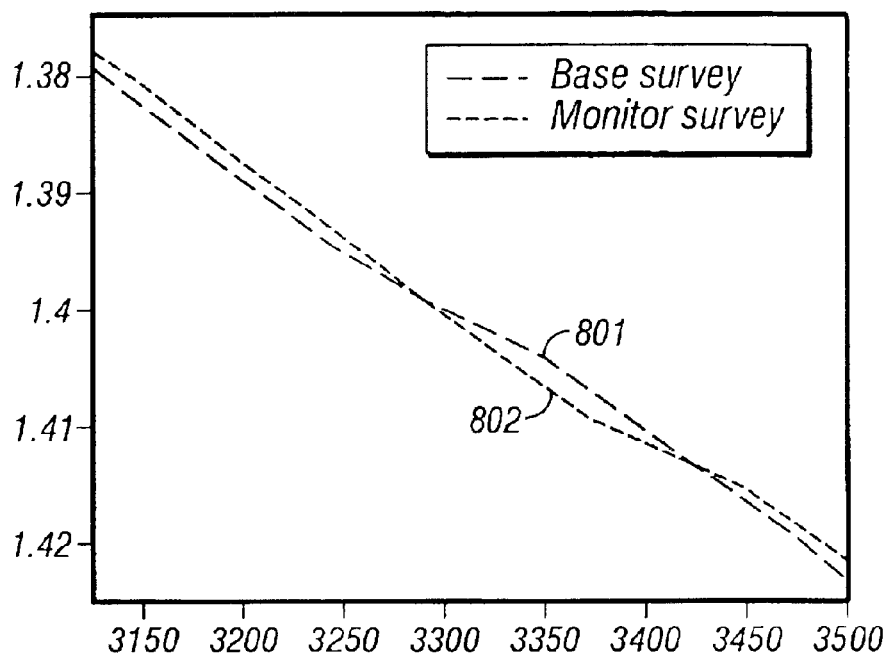
FIG. 8a is a plot of the arrival times at maximum amplitude versus the cross-line coordinate for the base and monitor surveys, after regularization without azimuth correction.
Figure 8B:
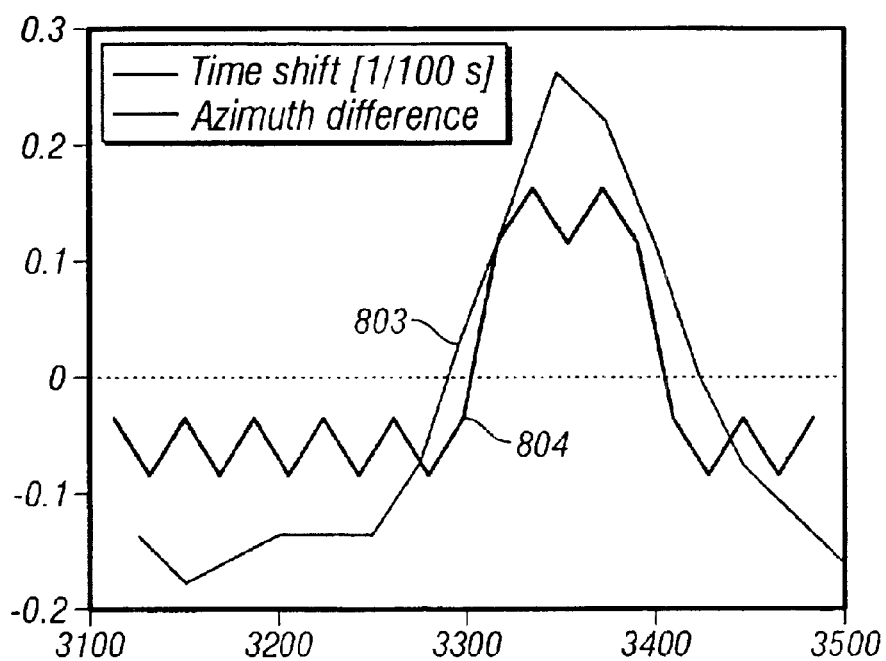
FIG. 8b is a plot of the time-shifts between the two surveys compared with the azimuth differences between the two surveys, versus the cross-line coordinate, after regularization without azimuth correction.

FIGS. 8a and 8b show more results of regularization without azimuth time-shift correction. FIG. 8a shows a plot of the arrival times at maximum amplitude versus the cross-line coordinate for the base 801 and monitor surveys 802. FIG. 8b shows a plot of the time-shifts 803 between the two surveys compared with the azimuth differences 804 between the two surveys, versus the cross-line coordinate. As expected, the time-shifts between the base and monitor survey correlate very strongly with the azimuth differences. FIG. 8b shows that only small time shifts exist between the two surveys. The maximum time shift between the surveys is approximately 2.5 ms, smaller than the standard time sampling interval of 4 ms.

Figure 9A:
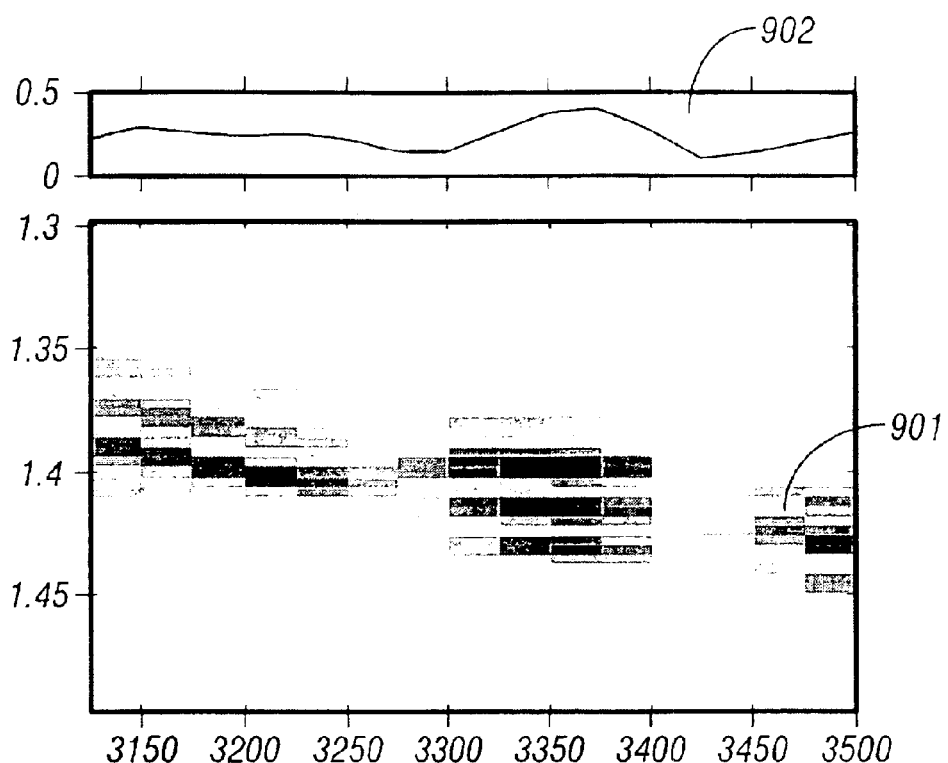
FIG. 9a is a cross-section in the cross-line direction for the common offset section of 2000 meters illustrating the difference between the base and monitor survey and a plot of the NRMS difference versus the cross-line coordinate, after regularization without azimuth correction.
Figure 9B:
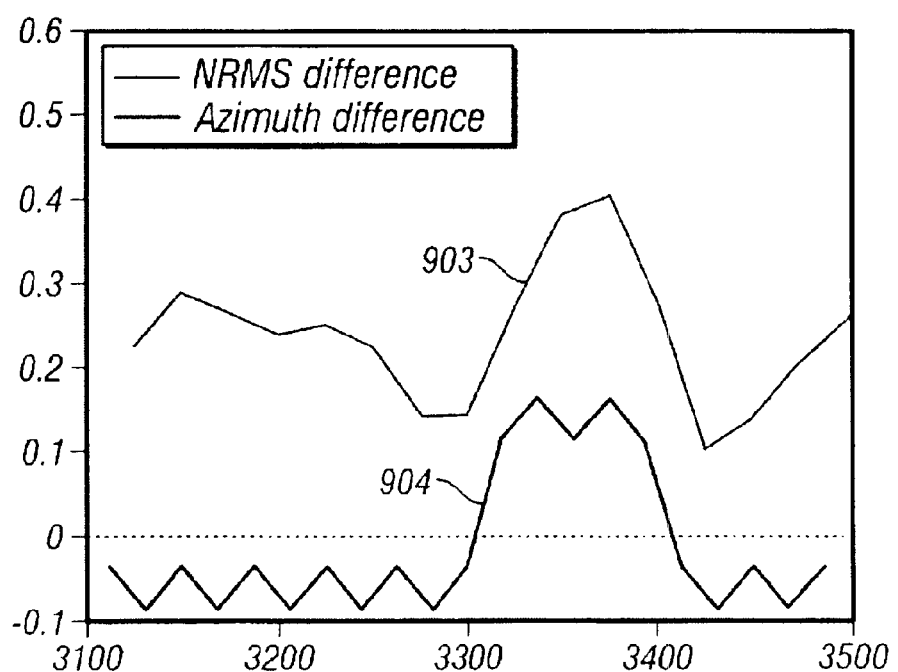
FIG. 9b is a plot of the normalized root mean square difference compared with the azimuth difference between the base and monitor surveys versus the cross-line coordinate, after regularization without azimuth correction.

FIGS. 9a and 9b show more results of regularization without azimuth correction. FIG. 9a shows a cross-section of the common offset section of 2000 meters illustrating the difference 901 between the base and monitor survey in the cross-line direction and a plot of the normalized root mean square (NRMS) difference 902 versus the cross-line coordinate. FIG. 9b shows a plot of the NRMS difference 903 compared with the azimuth difference 904 between the base and monitor surveys versus the cross-line coordinate. FIG. 9a shows that if the base and monitor survey are subtracted, then these time shifts mean that the difference is not zero. FIG. 9b shows that, again, the difference between the survey correlates strongly with the azimuth difference and, hence, the time shifts. The overall NRMS difference without azimuth correction is 25%, and the maximum NRMS difference is 40%.

Figure 10A:
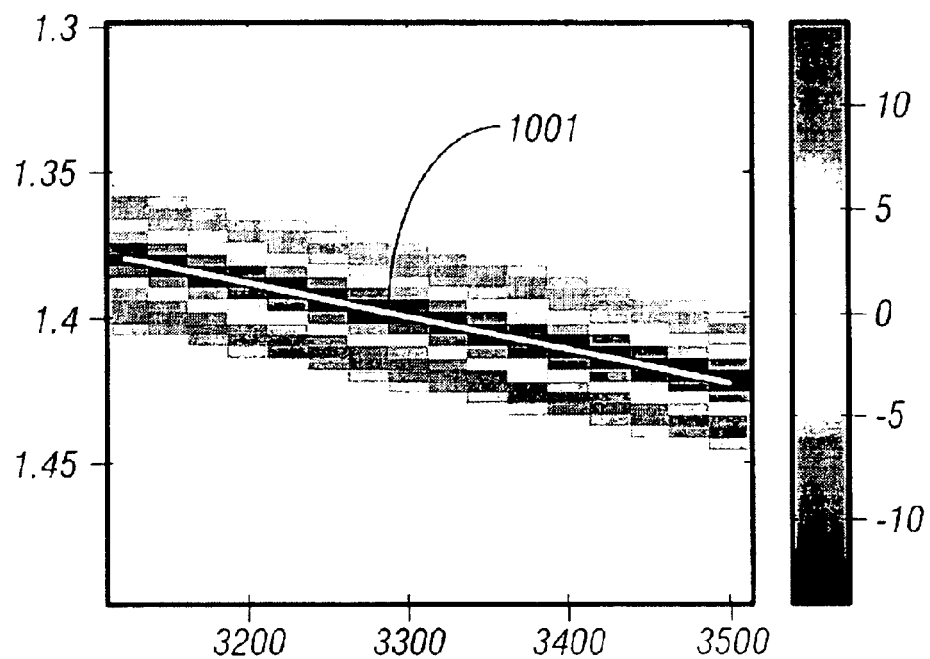
FIG. 10a is a cross-section in the cross-line direction for the common offset section of 2000 meters for the base survey after regularization with azimuth correction.
Figure 10B:
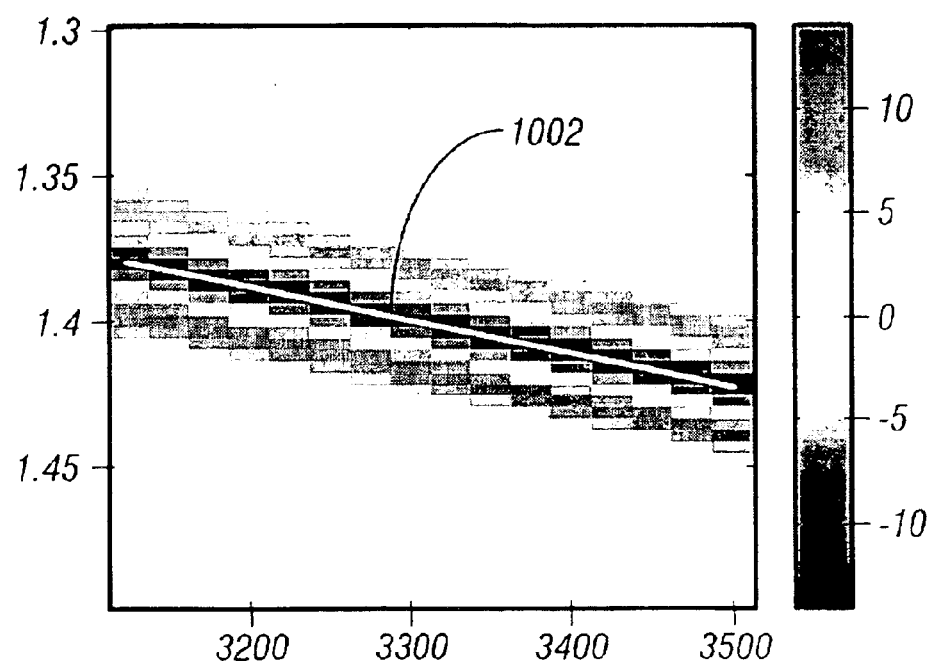
FIG. 10b is a cross-section in the cross-line direction for the common offset section of 2000 meters for the monitor survey after regularization with azimuth correction.

FIGS. 10a and 10b show cross-sections of cross-lines versus the cross-line coordinate for the 2000 m common offset section after regularization with azimuth correction. FIG. 10a shows the cross-lines for the base survey and FIG. 10b shows the cross-lines for the monitor survey. The lines 1001 in FIG. 10a and 1002 in FIG. 10b show the times for the maximum amplitude. FIGS. 10a and 10b may be compared with FIGS. 7a and 7b.

Figure 11A:
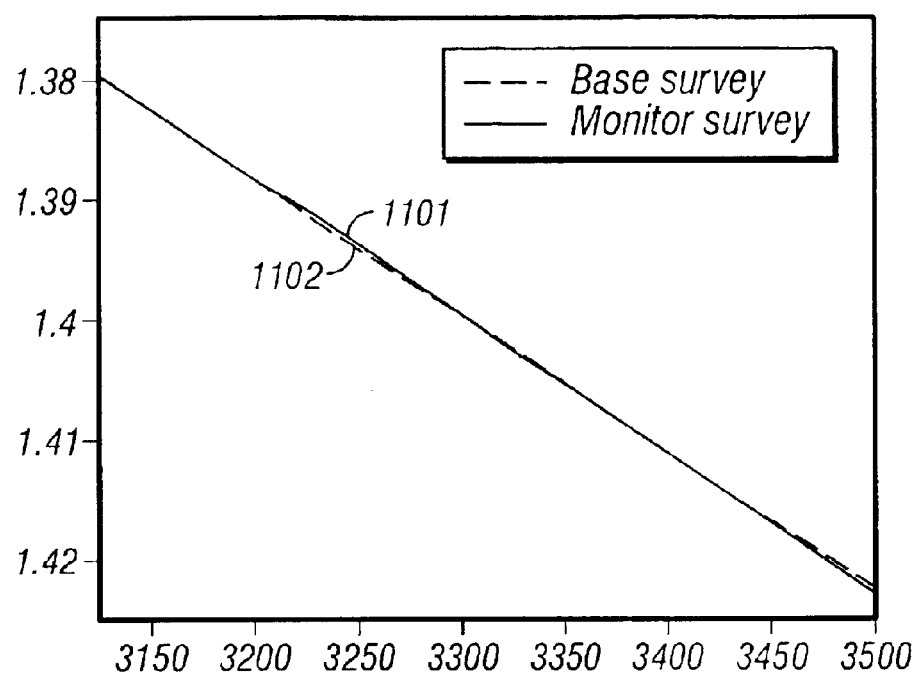
FIG. 11a is a plot of the arrival times at maximum amplitude versus the cross-line coordinate for the base and monitor surveys, after regularization with azimuth correction.
Figure 11B:
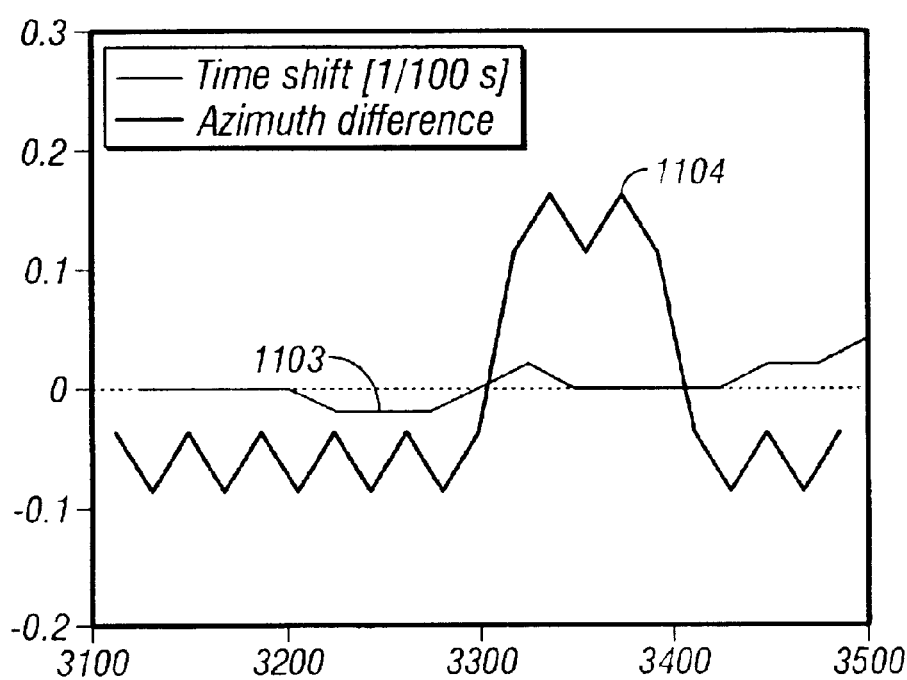
FIG. 11b is a plot of the time-shifts between the two surveys compared with the azimuth differences between the two surveys, versus the cross-line coordinate, after regularization with azimuth correction.

FIGS. 11a and 11b show more results of regularization with azimuth correction. FIG. 11a shows a plot of the arrival times at maximum amplitude versus the cross-line coordinate for the base 1101 and monitor surveys 1102. FIG. 11b shows a plot of the time-shifts 1103 between the two surveys compared with the azimuth differences 1104 between the two surveys, versus the cross-line coordinate. FIG. 11 a shows that the arrival times at maximum amplitude for base and monitor survey are now almost equal. FIG. 11b shows that the time shifts are in the order of tenths of milliseconds and now do not show a correlation with the azimuth differences. FIGS. 11a and 11b may be compared with FIGS. 8a and 8b.

Figure 12A:
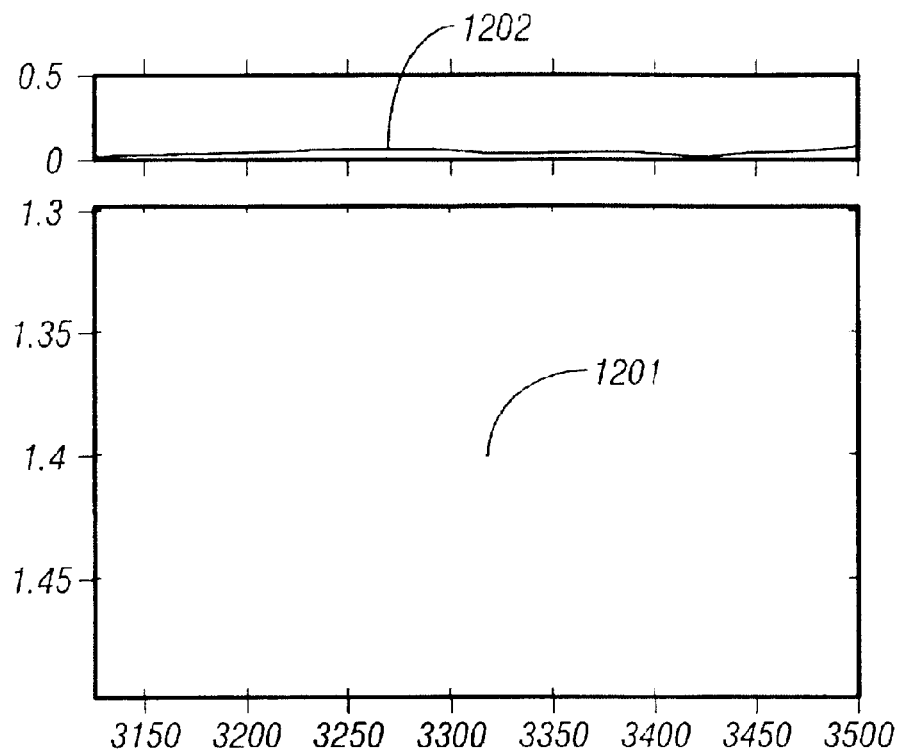
FIG. 12a is a cross-section in the cross-line direction for the common offset section of 2000 meters illustrating the difference between the base and monitor survey and a plot of the NRMS difference versus the cross-line coordinate, after regularization with azimuth correction.
Figure 12B:
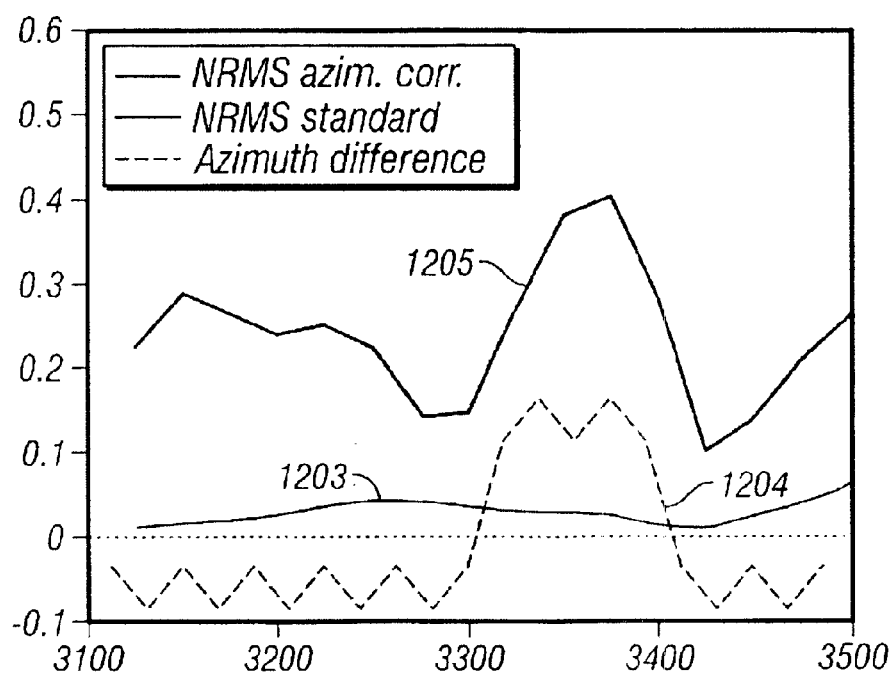
FIG. 12b is a plot of the normalized root mean square difference compared with the azimuth difference between the base and monitor surveys versus the cross-line coordinate, after regularization with and without azimuth correction.

FIGS. 12a and 12b show more results of regularization with azimuth correction. FIG. 12a shows a cross-section in the cross-line direction of the common offset section of 2000 meters illustrating the difference 1201 between the base and monitor surveys and a plot of the NRMS difference 1202 versus the cross-line coordinate. Comparison of FIG. 12a with FIG. 9a shows that the azimuth correction leads to much better repeatability. FIG. 12b shows a plot of the NRMS difference 1203 between the base and monitor surveys compared with the azimuth difference 1204 between the base and monitor surveys, versus the cross-line coordinate. For comparison, the NRMS difference 1205 between the base and monitor surveys without azimuth correction, from FIG. 6b, is shown.

Figure 13C:
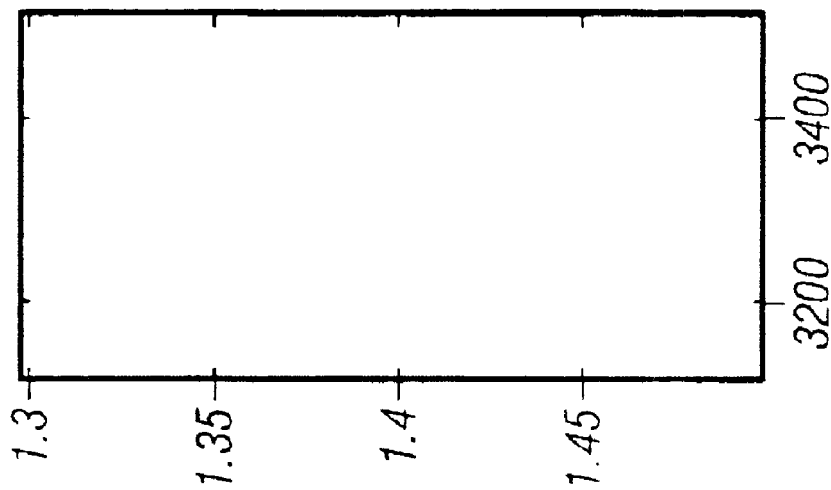
FIG. 13c is a cross-section in the cross-line direction illustrating the difference between the base and monitor surveys after regularization with azimuth correction While the invention will be described in connection with its preferred embodiments, it will be understood that the invention is not limited to these. On the contrary, the invention is intended to cover all alternatives, modifications, and equivalents that may be included within the scope of the invention, as defined by the appended claims.
Figure 13B:
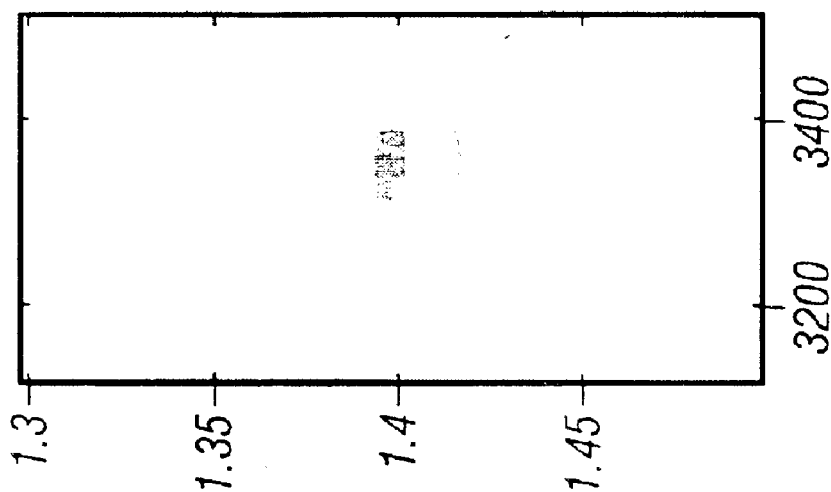
FIG. 13b is a cross-section in the cross-line direction illustrating the difference between the base and monitor surveys after regularization without azimuth correction.
Figure 13A:
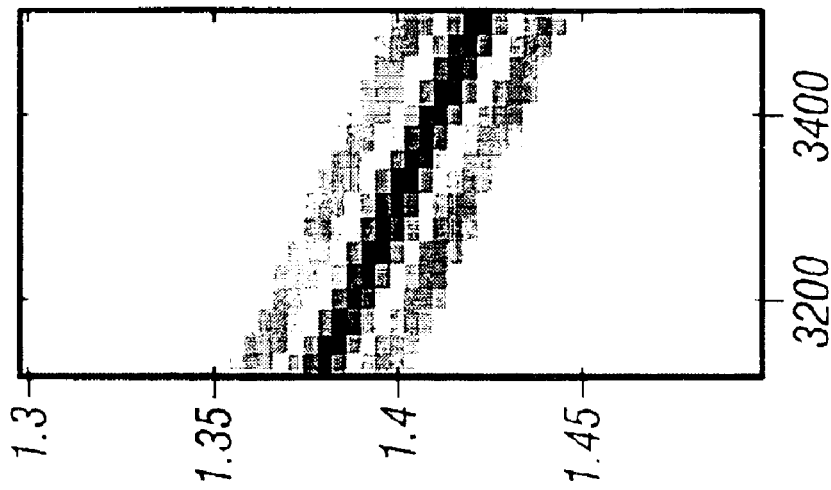
FIG. 13a is a cross-section in the cross-line direction illustrating the cross-lines of the common offset section of 2000 meters of the base survey.

Finally, FIGS. 13a, 13b, and 13c show cross-sections in the cross-line direction, all on the same scale for comparison. FIG. 13a shows the cross-lines of the common offset section of 2000 meters of the base survey. FIG. 13b shows the difference between the base and monitor surveys after regularization without azimuth correction. FIG. 13c shows the difference between the base and monitor surveys after regularization with azimuth correction. The overall NRMS difference with azimuth correction is 3.1% and the maximum NRMS difference is 6.0%. Without azimuth correction, these numbers were 25% and 40%.

The invention is a method for correcting for time shifts in the seismic data set resulting from azimuthal variation. In addition, the invention may be used for regularization of seismic data sets. The correction for the time shifts has been explicitly described in both 2D and 3D Radon regularization embodiments.

The time shift corrections are illustrated by the case of a single dipping layer in a homogeneous subsurface, but the invention is not limited by this. The azimuth correction is a dip and azimuth dependent time-shift, which is illustrated in the forward model of the least squares 2D Radon transform.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for processing a seismic data set, comprising:
    applying a transform to the seismic data set that corrects for time shifts in the seismic data set resulting from azimuthal variation.
2. The method of claim 1, wherein the transform is calculated from an inverse transform that corrects for time shifts in the seismic data set resulting from azimuthal variation.
3. The method of claim 2, further comprising:
    calculating a forward transform from the inverse transform.
4. The method of claim 3, further comprising:
    transforming the seismic data set, using the calculated forward transform; and
    inverse transforming the transformed seismic data set.
5. The method of claim 2, wherein the inverse transform is defined from a dip domain to a spatial domain.
6. The method of claim 5, wherein the dip domain is a Radon domain.
7. The method of claim 2, wherein the inverse transform is an inverse Radon transform.
8. The method of claim 7, wherein the inverse Radon transform is defined by:

$$P(x, y, \omega) = \frac{\Delta p_x \Delta p_y}{4\pi^2} \sum_{r=-R}^{R} \tilde{P}(p_{x,r}, p_{y,r}, \omega) \times$$

$$\exp\left[-j\omega\left(p_{x,r}x + p_{y,r}y + \frac{h^2}{2t_1}|p|^2 \sin(-\psi_1)\sin(\psi_1 - 2p_\theta)\right)\right],$$

where P is a function representing the seismic data in the spatial domain, $\tilde{P}$ is a function representing the transformed seismic data in the Radon domain, x and y are spatial coordinates, $\omega$ is temporal frequency, $p_x$ and $p_y$ are slowness parameters corresponding to x and y, respectively, $\Delta p_x$ and $\Delta p_y$ are regular sample intervals in the $p_x$ and $p_y$ coordinate directions, respectively, h is a half-offset, $t_1$ is a first arrival time of a reflection event, $\psi_1$ is a first azimuth, $|p|=\sqrt{p_x^2+p_y^2}$ is an absolute slowness and $p_\theta = \text{sign}(p_y)\cos^{-1}(p_x/|p|)$ is a slowness direction.

9. The method of claim 1, further comprising an initial step of:
    converting the seismic data set to a representation with an azimuth coordinate, at least one other spatial coordinate, and a time coordinate.
10. The method of claim 9, wherein at least one of the at least one other spatial coordinates is irregularly sampled.
11. The method of claim 10, wherein the transform that includes a correction for time shifts in the seismic data set resulting from azimuthal variation is utilized to regularize at least one of the at least one other spatial coordinates.
12. The method of claim 4, wherein the step of inverse transforming comprises:
    applying an inverse Radon transform to the transformed data set.
13. The method of claim 4, wherein the step of calculating a forward transform further comprises:
    applying a least squares inversion to the inverse transform.
14. The method of claim 13, wherein the step of applying a least squares inversion further comprises:
    applying a stabilization method to the least squares inversion.
15. The method of claim 14, wherein the stabilization method is a diagonal stabilization method.
16. The method of claim 14, wherein the stabilization method is a high-resolution stabilization method.
17. A method for processing a seismic data set, comprising:
    sorting the seismic data set to common offset gathers; and
    applying the following steps to each common offset gather:
        applying a transform to the common offset gather that corrects for time shifts in the common offset gather resulting from azimuthal variation; and
        inverse transforming the transformed common offset gather.
18. The method of claim 17, wherein the step of applying a transform to the common offset gather further comprises initial steps of:
    deriving an inverse transform that includes a correction for time shifts in the common offset gather resulting from azimuthal variation; and
    calculating the applied transform from the derived inverse transform.
19. The method of claim 18, wherein the derived inverse transform is defined from a dip domain to a spatial domain.
20. The method of claim 19, wherein the dip domain is a Radon domain.

21. The method of claim 18, wherein the derived inverse transform is an inverse Radon transform.

22. The method of claim 21, wherein the inverse Radon transform is defined by:

$$P(x, y, \omega) = \frac{\Delta p_x \Delta p_y}{4\pi^2} \sum_{r=-R}^{R} \tilde{P}(p_{x,r}, p_{y,r}, \omega) \times$$
$$\exp\left[-j\omega\left(p_{x,r}x + p_{y,r}y + \frac{h^2}{2t_1}|p|^2\sin(-\psi_1)\sin(\psi_1 - 2p_\theta)\right)\right].$$

where P is a function representing the seismic data in the spatial domain, $\tilde{P}$ is a function representing the transformed seismic data in the Radon domain, x and y are spatial coordinates, $\omega$ is temporal frequency, $p_x$ and $p_y$ are slowness parameters corresponding to x and y, respectively, $\Delta p_x$ and $\Delta p_y$ are regular sample intervals in the $p_x$ and $p_y$ coordinate directions, respectively, h is a half-offset, $t_1$ is a first arrival time of a reflection event, $\psi_1$ is a first azimuth, $|p|=\sqrt{p_x^2+p_y^2}$ is an absolute slowness and $p_{\theta=sign(p_y)}\cos^{-1}(p_x/|p|)$ is a slowness direction.

23. The method of claim 17, further comprising an initial step of:
converting the seismic data set to a representation with a first midpoint coordinate, a second midpoint coordinate, an offset coordinate, an azimuth coordinate, and a time coordinate.

24. The method of claim 23, wherein the first midpoint coordinate is an in-line midpoint coordinate and the second midpoint coordinate is a cross-line midpoint coordinate.

25. The method of claim 23, wherein at least one of the first midpoint, second midpoint, and offset coordinates is irregularly sampled.

26. The method of claim 17, further comprising initial steps of:
sorting the seismic data set to common shot gathers;
applying ID regularization to each common shot gather;
sorting the regularized common shot gathers to common offset gathers.

27. The method of claim 26, wherein the 1D regularization is a 1D Fourier regularization.

28. The method of claim 26, wherein the 1D regularization is applied to regularize offsets.

29. The method of claim 25, wherein the transform that includes a correction for time shifts in the seismic data set resulting from azimuthal variation is derived to regularize at least one of the first and second midpoint coordinates.

30. The method of claim 18, wherein the step of calculating the applied transform further comprises:
applying a least squares inversion to the derived inverse Radon transform.

31. The method of claim 30, wherein the step of applying a least squares inversion further comprises:
applying a stabilization method to the least squares inversion.

32. The method of claim 31, wherein the stabilization method is a diagonal stabilization method.

33. The method of claim 31, wherein the stabilization method is a high-resolution stabilization method.

34. The method of claim 17, wherein the step of inverse transforming further comprises:
applying an inverse Radon transform to the transformed data set.

35. The method of claim 18, wherein the step of deriving an inverse transform uses a sliding time-window approach with overlapping time windows.

36. The method of claim 18, wherein the step of deriving an inverse transform uses a sliding spatial-window approach with overlapping spatial windows.

* * * * *